Sept. 13, 1955     J. F. THOMAS     2,717,754
MOUNTING UNIT FOR A WEIGHING SCALE
Filed Jan. 18, 1952     2 Sheets-Sheet 1
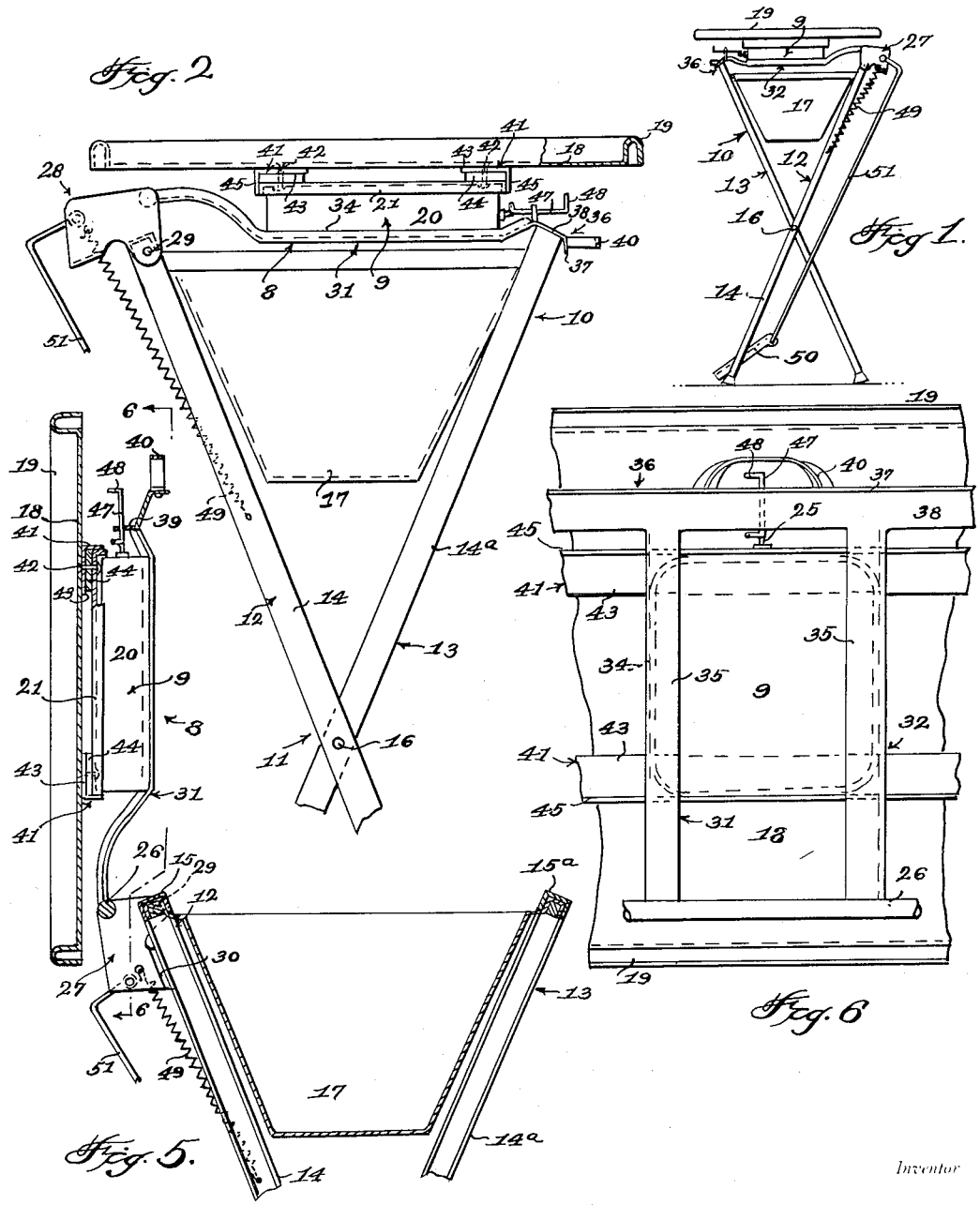
Inventor
JESSE F. THOMAS
By John N. Randolph
Attorney Sept. 13, 1955　　　　　J. F. THOMAS　　　　　2,717,754
MOUNTING UNIT FOR A WEIGHING SCALE
Filed Jan. 18, 1952　　　　　　　　　　　　2 Sheets-Sheet 2
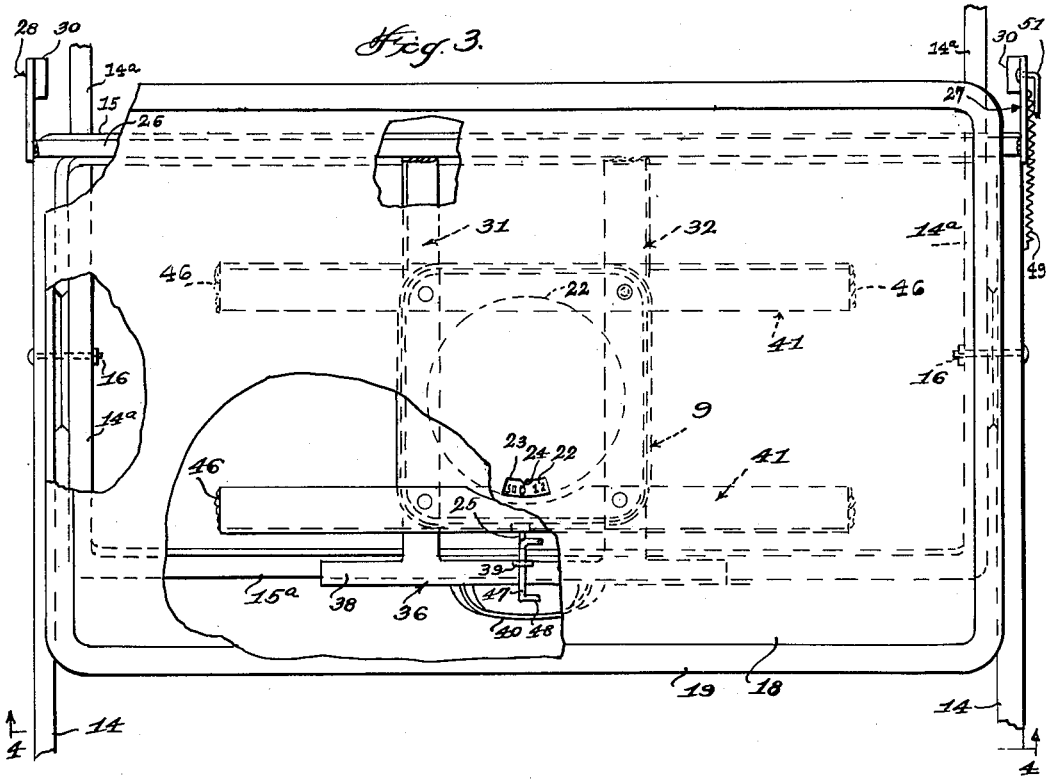
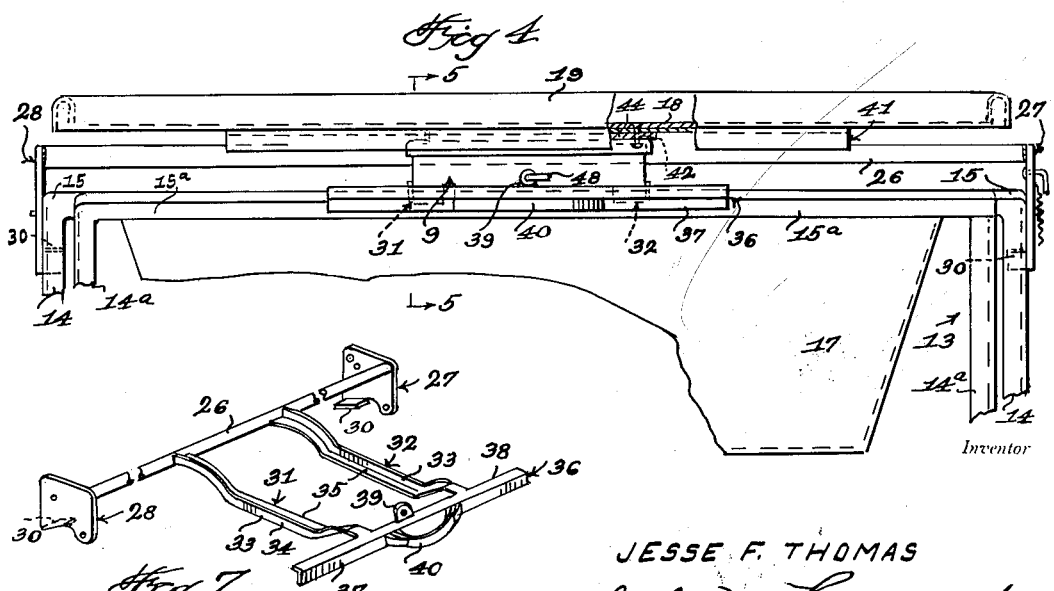
Inventor
JESSE F. THOMAS
By John N. Randolph
Attorney United States Patent Office 2,717,754
Patented Sept. 13, 1955

2,717,754

MOUNTING UNIT FOR A WEIGHING SCALE

Jesse F. Thomas, New London, Wis.

Application January 18, 1952, Serial No. 267,027

2 Claims. (Cl. 248—166)

This invention relates to a novel unit for mounting a conventional weighing scale on a supporting structure to enable the weighing scale to function in combination with the supporting structure without adversely affecting the functioning of the supporting structure in its various uses.

More particularly, it is an aim of the present invention to provide a unit for mounting a weighing scale and forming a connection between parts of a supporting structure whereby the weight placed upon the table top or platform portion of the supporting structure will be indicated on the weighing scale.

More particularly, it is an aim of the present invention to provide a mounting unit primarily adapted for use with a conventional baby bath for supporting the table top or platform thereof swingably with respect to the leg structure of the baby bath so that the table top and scale may swing with the scale supporting unit to elevated positions for exposing a bathing tub, or may support the table top in substantially a horizontal position to receive a baby and for simultaneously weighing the baby while it is being dressed, undressed, dried, et cetera.

Various other objects and advantages of the invention will hereinafter become more fully apparent from the following description of the drawings illustrating a presently preferred embodiment thereof, and wherein:

Figure 1 is an end elevational view showing the invention associated with a conventional scale and baby bath;

Figure 2 is an enlarged fragmentary end elevational view, partly in transverse section looking toward the opposite end of the baby bath and showing the unit in an operative position for supporting the weighing scale and baby bath platform or table top;

Figure 3 is an enlarged top plan view thereof, partly broken away to illustrate details of the invention;

Figure 4 is a fragmentary front elevational view looking in the direction as indicated by the line 4—4 of Figure 3;

Figure 5 is a cross sectional view taken substantially along a plane as indicated by the line 5—5 of Figure 4 but showing the invention disposed in a substantially upright inoperative position;

Figure 6 is a fragmentary vertical sectional view taken substantially along a plane as indicated by the line 6—6 of Figure 5, and Figure 7 is a perspective view of a part of the scale supporting unit, constituting the invention, shown removed from the baby bath and weighing scale.

Referring more specifically to the drawings, the scale mounting unit in its entirety and comprising the invention is designated generally 8 and is illustrated in conjunction with a conventional weighing scale, designated generally 9 and a conventional type of baby bath, designated generally 10. However, as the description proceeds it will become apparent that the unit 8 is capable of being employed with other supporting structures than the baby bath 10. To provide a better understanding of the unit 8, a brief description of pertinent portions of the baby bath 10 is necessary.

The baby bath 10 includes a leg structure, designated generally 11 comprising two U-shaped members 12 and 13 which are disposed in inverted positions. The inverted U-shaped member 12 includes a pair of substantially parallel legs 14 and an intermediate portion 15 connecting the upper ends of the legs 14. The inverted U-shaped member 13 includes a pair of legs 14a and an intermediate portion 15a which connects the upper ends of the legs 14a. The legs 14 and 14a are arranged in crossed relationship and complementary legs 14 and 14a are pivotally connected at 16, approximately intermediate of their ends to enable the leg structure 11 to be folded with the legs 14 and 14a positioned nearly parallel or to be disposed in extended positions, as illustrated in the drawings. A bathing tub 17 formed of a flexible, waterproof material is supported between the upper portions of the inverted U-shaped members 12 and 13 and is suitably secured thereto in any desired manner. The baby bath 10 also includes a platform or table top 18 which preferably has an upstanding rolled rim 19 extending completely therearound.

The weighing scale 9, which is likewise conventional, includes a body portion 20 and a platform 21 which is mounted on the body portion 20 and which is displaceable downwardly in a conventional manner by the weight of an object resting thereon for indicating the weight of the object. The scale 9 includes a movable dial 22 containing indicia representing pounds and a portion of which is visible through an opening 23 in the platform 21, adjacent a pointer 24. The scale 9 also includes mechanism, not shown, for rendering it inoperative and which is manually operated by a lever 25 which projects from the front wall of the body portion 20.

The parts 9 through 25 which have been briefly described, constitute no part of the present invention but have merely been described since they function in conjunction with parts of the scale mounting unit 8.

The mounting unit 8, comprising the invention, includes an elongated bar or rod 26. Each end of the bar or rod 26 is secured to a plate which is disposed in a plane substantially perpendicular to the axis of the bar or rod 26. One of said plates is designated generally 27 and the other plate is designated generally 28. The plates 27 and 28 correspond in shape and the ends of the rod or bar 26 are secured to the plates adjacent corresponding corners thereof. The plates 27 and 28 are pivotally connected by pivot pins 29 to the legs 14, adjacent the upper ends of said legs. The plates 27 and 28 have struck out inturned flanges forming stops 30 which are spaced from the ends of the bar 26 and from the pivots 29, for a purpose which will hereinafter become apparent.

A pair of angle bars 31 and 32 are secured at corresponding ends thereof to the bar 26 in longitudinally spaced relationship to one another and to the plates 27 and 28. The bars 31 and 32 extend at right angles from the rod or bar 26 and have corresponding downwardly offset intermediate portions 33. Each of the bars 31 and 32 includes a substantially vertical side 34 and an inwardly extending substantially horizontal side 35. The opposite ends of the bars 31 and 32 are secured to longitudinally spaced portions of a front bar 36 which is likewise of angular cross section and which is disposed at substantially a right angle to the bars 31 and 32 and substantially parallel to the bar 26. The front bar 36 includes a depending outer wall 37 and an inwardly extending upper wall 38 which extends inwardly from the upper edge of the wall 37 and which is suitably secured to or formed integral with corresponding ends of the bars 31 and 32. The wall 38 is provided intermediate of its ends with an upstanding apertured guide lug 39, and the wall 37 is provided intermediate of its ends with a handle 40. In the normal position of the support 8, the rod 26 is disposed almost directly above the pivots 29, and when thus disposed, the bars 31 and 32 are positioned substantially horizontal and the front bar 36 is disposed so that its upper wall 38 rests upon the intermediate portion 15a of the inverted U-shaped member 13 and its outer wall 37 is disposed just forwardly of the intermediate portion 15a, as illustrated in Figures 1 and 2. Portions of the bottom of the scale body 9 rest upon and are suitably secured to the horizontal sides 35 of the downwardly offset bar portions 33 and between the vertical sides 34 thereof. A pair of bars 41 of angular cross section are secured by fastenings 42 to the platform 21 of the scale 9 and each includes a side 43 which is disposed above and spaced from the platform 21 by a spacing block or blocks 44 through which the fastenings 42 extend. The other depending sides 45 of the bars 41 are disposed beyond the front and rear edges of the platform 21, as best illustrated in Figure 2. The bars 41 extend substantially beyond the side edges of the scale 9 and the underside of the table top or platform 18 rests upon the upper surfaces of the sides 43 of said bars 41 and is suitably secured thereto, as by welding, as indicated at 46 in Figure 3. The bars 41 and spacers 44 combine with the elements illustrated in Figure 7 to form the scale mounting unit 8 comprising the invention and which supports the scale on the leg structure 11 and the table top or platform 18 upon the scale 9 and normally above and out of engagement with the leg structure 11 and for movement toward and away from said leg structure.

An actuating member 47 has an intermediate portion journalled in the guide lug 39 and an inner end secured to the lever 25. The member 47 has an angularly turned outer end 48 forming a handle for manually turning the member 47 and lever 25 to render the scale 9 operative or inoperative at will.

The handle 40 may be grasped for swinging the unit 8 upwardly and rearwardly about the axis of the pivots 29 in a counterclockwise direction from its position of Figure 2 to its position of Figure 5, and in so moving, the scale 9 and platform 18 will move with the unit 8 so that when the parts are in their positions of Figure 5, the tub 17 will be exposed for use. As the parts are swung from their positions of Figure 2 to their positions of Figure 5, the stops 30 are swung downwardly and inwardly into engagement with the outer edges of the legs 14 for limiting the rearward swinging movement of the unit 8 and to prevent it from swinging rearwardly past substantially an upright position. Pull springs 49 may be anchored to the plates 27 and 28 and to the legs 14 therebelow for urging said plates to swing counterclockwise on the pivots 29 to partially counterbalance the weight of the unit 8, scale 9 and platform 18 as said parts are swung to and from their positions of Figures 2 and 5. The parts may also be swung to their positions of Figure 5, if desired, by means of a foot pedal or treadle 50 which is pivoted to one of the legs 14, near its lower end, and which has one of its ends pivotally connected to one end of a connecting rod 51, the opposite end of which is pivoted to the plate 27 remote to its pivot 29.

The platform 18 is provided with an opening 52 in registration with the opening 23 through which a portion of the dial 22 is visible for reading the weight indicated thereby. It will thus be readily apparent when the parts are in their positions of Figures 1, 2 and 4 that the weight of an infant placed upon the table top or platform 18 can be read while said member is being used for supporting the infant while it is being dressed, undressed, dried or while any other care of the child is being accomplished.

It will also be obvious that the unit 8 may be utilized for supporting a weighing scale and platform or table top relatively to a leg structure of other devices than a baby bath and where the leg structure is not collapsible and if desired where the table top or platform is not swingable between a horizontal and vertical position, merely by substituting rigid fastenings for the pivots 29.

Various other modifications and changes are likewise contemplated and may obviously be resorted to, without departing from the spirit or scope of the invention as hereinafter defined by the appended claims.

I claim as my invention:

1. A mounting unit for use with a leg structure having pairs of legs pivotally connected in cross relationship and including rung members connecting complementary legs of the two pairs of legs at the upper ends of said legs, said mounting unit being adapted to swingably support a platform type weighing scale and comprising a pair of plates adapted to be connected to the legs of one of said pairs of legs adjacent the upper ends of said legs, a first bar extending between and rigidly connected at its ends to the plates, a pair of bars secured to the first bar at corresponding ends of said last mentioned bars and extending transversely from said first bar, said bars of the pair of bars being disposed in spaced relation to one another and forming a support on which a weighing scale is adapted to be secured, a second bar rigidly secured to the opposite ends of said pair of bars and disposed transversely thereof, said second bar being adapted to rest on the rung member of the other legs of said pairs of legs for supporting the pair of bars on top of the leg structure and in substantially a horizontal position, said plates being adapted to be pivotally connected to the first mentioned legs for swinging movement of the mounting unit and weighing scale from a substantially horizontal operative position above the leg structure to a substantially vertical inoperative position at one side of said leg structure, and said plates having inwardly extending flanges forming stops adapted to be disposed in engagement with the first mentioned legs when the mounting unit is in the inoperative position for limiting swinging movement of the mounting unit rearwardly past its upright position.

2. A mounting unit for use with a leg structure having pairs of legs pivotally connected in cross relationship and including rung members connecting complementary legs of the two pairs of legs at the upper ends of said legs, said mounting unit being adapted to swingably support a platform type weighing scale and comprising a pair of plates adapted to be connected to the legs of one of said pairs of legs adjacent the upper ends of said legs, a first bar extending between and rigidly connected at its ends to the plates, a pair of bars secured to the first bar at corresponding ends of said last mentioned bars and extending transversely from said first bar, said bars of the pair of bars being disposed in spaced relation to one another and forming a support on which a weighing scale is adapted to be secured, a second bar rigidly secured to the opposite ends of said pair of bars and disposed transversely thereof, said second bar being adapted to rest on the rung member of the other legs of said pairs of legs for supporting the pair of bars on top of the leg structure and in substantially a horizontal position, said plates being adapted to be pivotally connected to the first mentioned legs for swinging movement of the mounting unit and weighing scale from a substantially horizontal operative position above the leg structure to a substantially vertical inoperative position at one side of said leg structure, said second bar being elongated and substantially flat and being transversely inclined downwardly and outwardly relative to the pair of bars, and said pair of bars having end portions disposed adjacent the second bar and extending downwardly and inwardly from the upper or inner edge of the second bar to provide a rung engaging seat.

(References on following page)

References Cited in the file of this patent

UNITED STATES PATENTS

| Number | Name | Date |
|---|---|---|
| 359,914 | Williamson | Mar. 22, 1887 |
| 416,399 | Craig | Dec. 3, 1889 |
| 433,516 | Charles | Aug. 5, 1890 |
| 628,712 | Hoshour | July 11, 1899 |
| 1,020,597 | Brunt | Mar. 19, 1912 |
| 1,203,583 | Clark | Nov. 7, 1916 |
| 1,223,577 | Gonsky | Apr. 24, 1917 |
| 1,250,905 | Liljegran | Dec. 18, 1917 |
| 1,286,391 | Neblett | Dec. 3, 1918 |
| 1,424,190 | Cole et al. | Aug. 1, 1922 |
| 1,630,279 | Stroop et al. | May 31, 1927 |
| 1,969,365 | Gilbert | Aug. 7, 1934 |
| 1,992,262 | Upp | Feb. 26, 1935 |
| 2,113,689 | Haban | Apr. 12, 1938 |
| 2,140,685 | Baxter | Dec. 20, 1938 |
| 2,412,270 | Johnston | Dec. 10, 1946 |
| 2,467,467 | De Puy et al. | Apr. 19, 1949 |
| 2,500,035 | Hollander | Mar. 7, 1950 |
| 2,560,945 | Goldberger | July 17, 1951 |

FOREIGN PATENTS

| Number | Country | Date |
|---|---|---|
| 848,661 | France | July 31, 1939 |